United States Patent
Jeter et al.

(10) Patent No.: US 11,068,513 B2
(45) Date of Patent: Jul. 20, 2021

(54) FEATURE MANAGEMENT FOR WEB MAP TILE SERVICES

(71) Applicant: Intergraph Corporation, Madison, AL (US)

(72) Inventors: Gary W. Jeter, Huntsville, AL (US); Mohiddin Baig, Madison, AL (US)

(73) Assignee: Intergraph Corporation, Madison, AL (US)

( * ) Notice: Subject to any disclaimer, the term of this patent is extended or adjusted under 35 U.S.C. 154(b) by 607 days.

(21) Appl. No.: 15/802,911

(22) Filed: Nov. 3, 2017

(65) Prior Publication Data

US 2018/0129681 A1     May 10, 2018

Related U.S. Application Data

(60) Provisional application No. 62/417,620, filed on Nov. 4, 2016, provisional application No. 62/444,964, filed on Jan. 11, 2017.

(51) Int. Cl.

| | |
|---|---|
| *G06F 16/29* | (2019.01) |
| *G06F 16/23* | (2019.01) |
| *G06F 16/957* | (2019.01) |
| *G06F 16/2453* | (2019.01) |
| *G01C 21/32* | (2006.01) |

(52) U.S. Cl.
CPC ............ *G06F 16/29* (2019.01); *G01C 21/32* (2013.01); *G06F 16/2358* (2019.01); *G06F 16/24539* (2019.01); *G06F 16/9574* (2019.01)

(58) Field of Classification Search
CPC .......... G06F 16/29; G06F 16/9574; G06F 16/24539; G06F 16/2358; G01C 21/32
See application file for complete search history.

(56) References Cited

U.S. PATENT DOCUMENTS

| | | |
|---|---|---|
| 8,711,181 B1 | 4/2014 | Nourse et al. |
| 2005/0270299 A1 | 12/2005 | Rasmussen et al. |
| 2012/0173606 A1 | 7/2012 | Becker |

(Continued)

FOREIGN PATENT DOCUMENTS

| | | |
|---|---|---|
| CA | 2953656 C | * 11/2018 |
| CN | 101 014 831 B | 8/2013 |

(Continued)

OTHER PUBLICATIONS

International Searching Authority, Notification of Transmittal of the International Search Report and the Written Opinion of the International Searching Authority, or the Declaration, PCT/US2017/059884, 20 pages, dated Apr. 6, 2018.

(Continued)

*Primary Examiner* — Mark D Featherstone
*Assistant Examiner* — Ranjit P Doraiswamy
(74) *Attorney, Agent, or Firm* — Nutter McClennen & Fish LLP

(57) ABSTRACT

In accordance with one embodiment of the invention, a method ensures, by a web map tile service, the updated display of features. In this method, a web map tile service database receives a change to a feature on a map and a server system identifies rendered tiles in a cache that are impacted by the change to the feature. The server system invalidates the identified rendered tiles in the cache by, for example, removing them.

20 Claims, 10 Drawing Sheets

(56) References Cited

U.S. PATENT DOCUMENTS

| | | | |
|---|---|---|---|
| 2015/0170388 A1* | 6/2015 | Chawathe | G06T 11/60 345/629 |
| 2015/0347457 A1* | 12/2015 | Zhu | G06F 16/29 707/743 |
| 2016/0246468 A1* | 8/2016 | Harrower | G09B 29/004 |

FOREIGN PATENT DOCUMENTS

| | | |
|---|---|---|
| CN | 103 425 754 B | 6/2016 |
| EP | 2 693 325 A1 | 2/2014 |

OTHER PUBLICATIONS

European Office Action for Application No. 17805332.8 dated Jun. 24, 2020 (7 pages).

\* cited by examiner

US 11,068,513 B2

FEATURE MANAGEMENT FOR WEB MAP TILE SERVICES

RELATED APPLICATIONS

This application claims priority to U.S. Application No. 62/417,620, entitled "Feature Management for Web Map Tile Services" and filed Nov. 4, 2016, and U.S. Application No. 62/444,964, entitled "Feature Management for Web Map Tile Services" and filed Jan. 11, 2017, which are hereby incorporated by reference in their entireties.

TECHNICAL FIELD

Illustrative embodiments of the invention generally relate to managing features displayed in a web map tile service (WMTS), and, more particularly, to ensuring that features are displayed properly to users after the features are changed on maps.

BACKGROUND ART

In a conventional web map tile service (WMTS), a map is divided into discrete partitions (i.e., tiles). When the service receives a user request for a portion of the map, the service retrieves the corresponding data to be rendered as individual tiles. If a feature falls within one of the tiles, the service renders the tile with the feature, accordingly. As FIGS. 1-3 demonstrate, a properly displayed feature may span multiple tiles. However, due to the technical manner in which the feature is represented in the WMTS system, only a subset of the tiles may be rendered with the feature. As a result of this technical shortfall, conventional WMTS may fail to display the feature properly.

For example, in FIG. 1, the star may be represented based on the location of its origin (e.g., center), which lies exclusively within tile 1. When the service renders tile 1, the service recognizes that the star is associated with the tile and renders a portion of the star as part of the tile. However, because the star's origin falls outside tiles 2, 4, and 5, the service fails to recognize any association between the star and these tiles. As a result, the tiles are rendered without the star. Even though a properly displayed star would span tiles 1, 2, 4, and 5, a conventional WMTS would only render the portion in tile 1 and the star would appear truncated.

In another example, FIG. 2 depicts a feature associated with multiple tiles, but whose display would span even more. Because the center of a road runs through tiles 4-6, the service recognizes an association between these tiles and the road. A conventional WMTS renders these tiles with the portion of the road that lies within them. Due to the width of the road, the road may span tiles 7-9. However, because the tiles do not include the central path of the road, data for tiles 7-9 do not include the feature. As a result, the WMTS renders tiles 7-9 without the road, and the road appears truncated.

In a further example, FIG. 3 depicts a label whose display spans multiple tiles. Because the label's origin lies in tile 1, only tile 1 is recognized for including the feature. Thus, a conventional WMTS renders tile 1 with the portion of the feature falling within its boundaries, but no other tile is rendered with the label. Consequently, the label appears truncated. FIGS. 4-6 depict further examples of how maps provided by a web map tile service may display truncated labels, as highlighted by the arrows.

Additionally, a conventional WMTS is capable of offering only static maps, e.g., after a user requests a map, the user is confined to one particular version of that map. If a single feature of the map changes, the user must request an entirely new map. As a result, even if the features of two maps are almost identical, the conventional WMTS must nevertheless retrieve data for the new map and render tiles anew, thereby increasing latency for the user.

SUMMARY OF THE EMBODIMENTS

In accordance with one embodiment of the invention, a method ensures, by a web map tile service, the updated display of features. In this method, a web map tile service database receives a change to a feature on a map and a server system identifies rendered tiles in a cache that are impacted by the change to the feature. The server system invalidates the identified rendered tiles in the cache by, for example, removing the tiles from the cache.

In this method, the web map tile service database receives a change to a feature on a map and updates the feature on the map based on the change. A server system identifies rendered tiles in a cache that are impacted by the change to the feature and invalidates the identified rendered tiles in the cache. The server system also receives a request from a client to display a portion of the map that includes the updated feature. The server system retrieves the updated feature from the web map tile service database and re-renders the invalidated tiles identified as impacted by the change to the feature, for display to the client. The server system may remove the identified rendered tiles from the cache.

In this method, the server system may store the change to the feature in a modification log. The server system may identify the impacted rendered tiles based on the changes to the features stored in the modification log. In some embodiments, the servers system identifies the impacted rendered tiles after a predetermined interval of time has elapsed, and/or removes all changes to features from the modification log after the impacted rendered tiles have been identified. The server system may identify the impacted tiles based on an origin of the feature, and a length of the feature, a maximum known length of features on the map, or both. In some embodiments, the change to the feature includes a change to a style, length, or orientation of the feature, or any combination thereof.

In some embodiments, the server system compares the length in the change to the feature to a maximum known length of features on the map, and updates the maximum known length based on the length in the change to the feature.

In accordance with another embodiment of the invention, a method ensures, by a web map tile service, display of features spanning more than one tile. In this method, using the web map tile service, a server system receives a request from a client to display a portion of a map. The server system identifies a new feature within the requested portion of the map and updates a maximum known length of features on the map based on a length of the new feature. The server system identifies potentially erroneously rendered tiles in the requested portion of the map based on at least one tile associated with the new feature, and the maximum known length of features on the map. The server system invalidates the potentially erroneously rendered tiles in the cache.

The server system receives a request from a client to display a second portion of the map. For each tile within the second portion of the map that has not been validly rendered, the server system searches for at least one feature within the maximum known length of features on the map from the tile, and renders the tile with any features found within the maximum known length of features on the map from the tile, for display to the client.

In some embodiments, the server system removes the potentially erroneously rendered tiles from the cache. The server system may render the tile according to the text, style, or combination thereof of features found within the maximum known length of features on the map from the tile. The server system may update the maximum known length of features on the map based on a distance on the ground covered by the new feature.

In various embodiments, an apparatus with at least one processor and at least one memory is encoded with instructions. Execution of the instructions by the at least one processor causes the at least one processor to perform any of the steps described above. Further, a computer program product includes a non-transitory computer-readable medium having computer code thereon for recommending a business for investment. The computer code includes program code for performing any of the steps described above.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

To ensure that features that span multiple tiles are properly rendered and displayed by a web map tile service (WMTS), illustrative embodiments of the invention store a maximum known length of a feature or class of features on the map. The WMTS of the invention uses this maximum known length to identify tiles that may have been inaccurately rendered without one or more features. In particular, each time the WMTS identifies a new feature, the WMTS compares the length of the new feature against the maximum known length of features on the map, and updates the latter accordingly. Because features may be longer than previously understood, the WMTS recognizes that tiles within the maximum known length of the new feature may have been improperly rendered without the feature, and takes measures to ensure the tiles will be re-rendered properly.

Moreover, the WMTS enables maps to be dynamically modified so that users may have access to the maps' most recent updates. To ensure that the map is correctly displayed to users, each time the map is changed, the WMTS determines which rendered tiles would be impacted and prevents the obsolete tiles from being displayed (e.g., by removing them from a cache). When a user requests any portion of the map that has changed, the WMTS re-renders tiles using the updated data. By delaying the re-rendering until it is necessary for providing the user with a seamless experience, the WMTS improves its latency.

Figure 7:
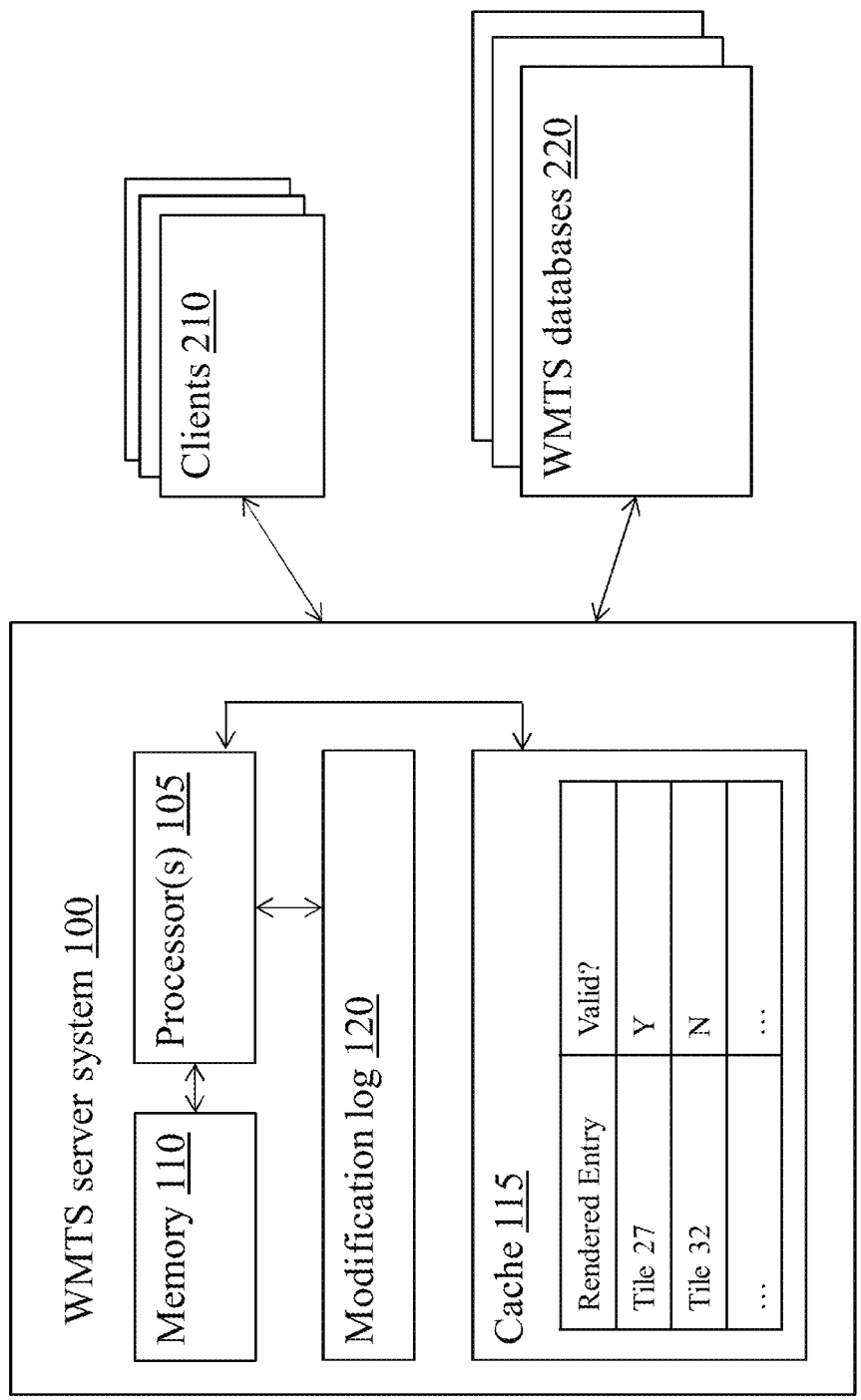
FIG. 7 depicts an exemplary server system of the web map tile service for implementing the present solution.

FIG. 7 depicts an exemplary server system 100 of the WMTS (also referred to herein as "WMTS server system" or just "server system") for implementing illustrative embodiments of the invention. The server system 100 includes one or more servers, each of which includes one or more processors 105. The server system 100 also includes memory 110 that may store instructions that, when executed, perform the steps described in this disclosure (the instructions may also be located on storage, such as disk, and transferred to memory for execution).

The memory 110 also stores the maximum known length of features on a map. In some embodiments, this maximum known length is a single variable covering all types of features, such as alphanumeric labels, types of icons (e.g., points, stars, mountain peaks), and types of graphics (e.g., roads, trails). Alternatively, the server system 100 may store maximum known lengths for different types of features. Thus, there may be a maximum known length for labels, a maximum known length for icons, and a maximum known length for graphics. In some embodiments, the memory 110 further stores the locations of known features on the map. The server system 100 also includes a cache 115 that stores entries for rendered tiles of the map. In some embodiments, each entry includes a field, such as a flag, indicating whether the entry is valid (e.g., update to date, correctly rendered).

When the server system 100 first offers a particular map, the server system 100 may clear all entries in its cache 115 and initialize its maximum known length of features to zero (0). The server system 100 receives user requests for portions of a map from clients 210. To service a request, the server system 100 retrieves copies of rendered tiles corresponding to the requested portion from its cache 115. If the cache 115 does not include some of the needed tiles, the server system 100 retrieves data from the WMTS databases 220 and renders the missing tiles. The server system 100 stores the newly rendered tiles in the cache 115 (in some embodiments, the new entries are set to a "valid" status) and sends copies of the tiles for the requested map portion to the client 210 for display to the user.

When the server system 100 determines that a tile includes a feature, the tile is rendered with the portion of the feature that resides within. The WMTS databases 220 may store information about each feature, such as its length, style (e.g., type of font, size of font, shape, color), or orientation (e.g., angle that the label forms, relative to a horizontal axis). Because the server system 100 may not initially recognize an association between a feature and a tile, when the cache 115 for a map is still being filled, the cache 115 may include tiles that have been rendered inaccurately, i.e., without corresponding portions of features.

However, when the server system 100 identifies a new feature, the server system 100 determines if the length of the newly discovered feature exceeds the maximum known length of features and updates the maximum known length, accordingly. Each time the maximum known length is updated, the server system 100 identifies tiles in the cache 115 that may have been rendered incorrectly.

For example, suppose the previous maximum known length of features was 50 meters, and a tile in a new user request includes a feature that is 100 meters long. Because the WMTS system has learned that the new feature is 100 meters long, the WMTS system recognizes that tiles corresponding to geographic areas within 100 meters of the feature's location may have been previously rendered without the feature. Consequently, the server system 100 may set the cached entries of these tiles to "invalid". Alternatively, the entries may be removed from the cache, altogether. Although the feature may not actually span some of these tiles, this technical solution nevertheless invalidates the rendered tiles as a precaution.

After the maximum known length of features becomes non-zero, each time the server system 100 receives a user request, the server system 100 searches the geographic area outside the boundaries of the requested map portion by the maximum known length of features. If this area includes features, the server system 100 analyzes the feature information to determine if any part of the feature should be rendered in the tiles for the requested map portion. In this manner, the server system 100 may identify features that span the requested map portion and render the affected tiles accordingly.

Figure 3:
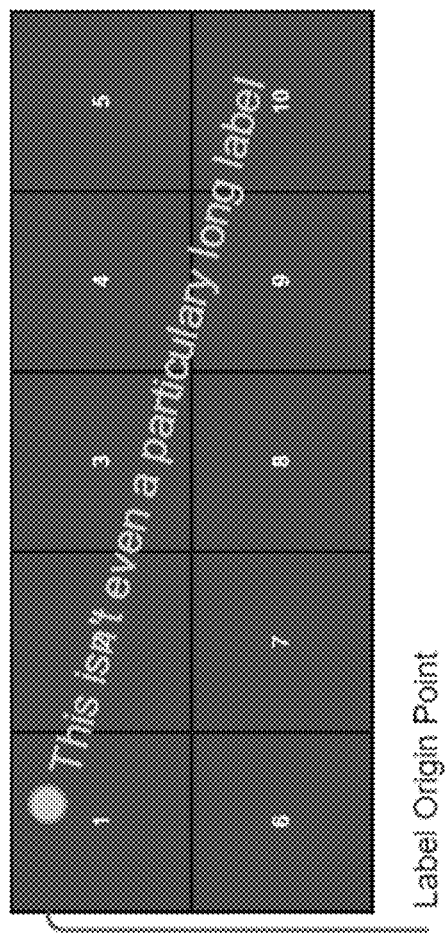
FIG. 3 depicts a further exemplary feature to be displayed on tiles provided by a web map tile service.
Figure 4:
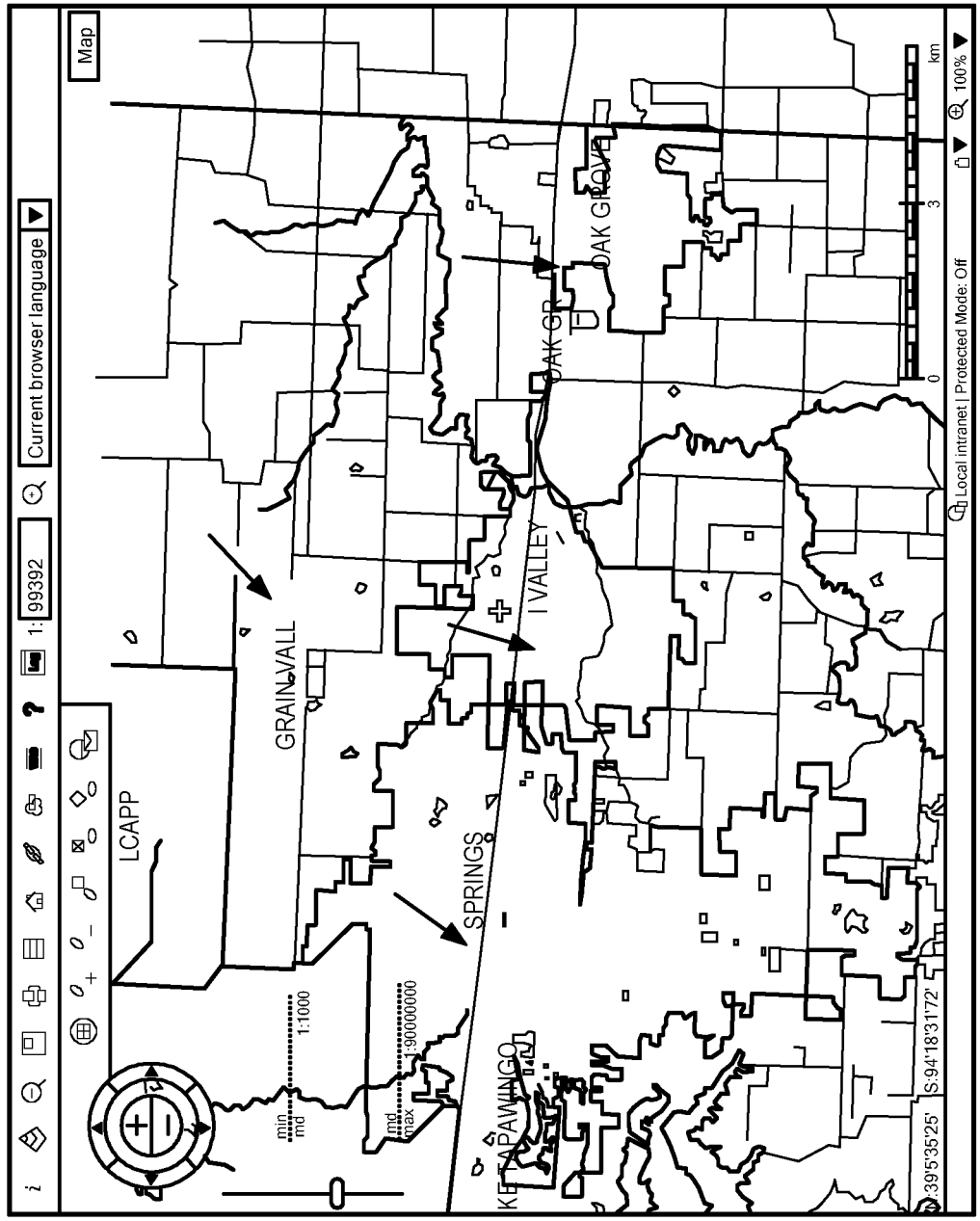
FIG. 4 depicts examples of improperly rendered (i.e., truncated) labels on a map.
Figure 5:
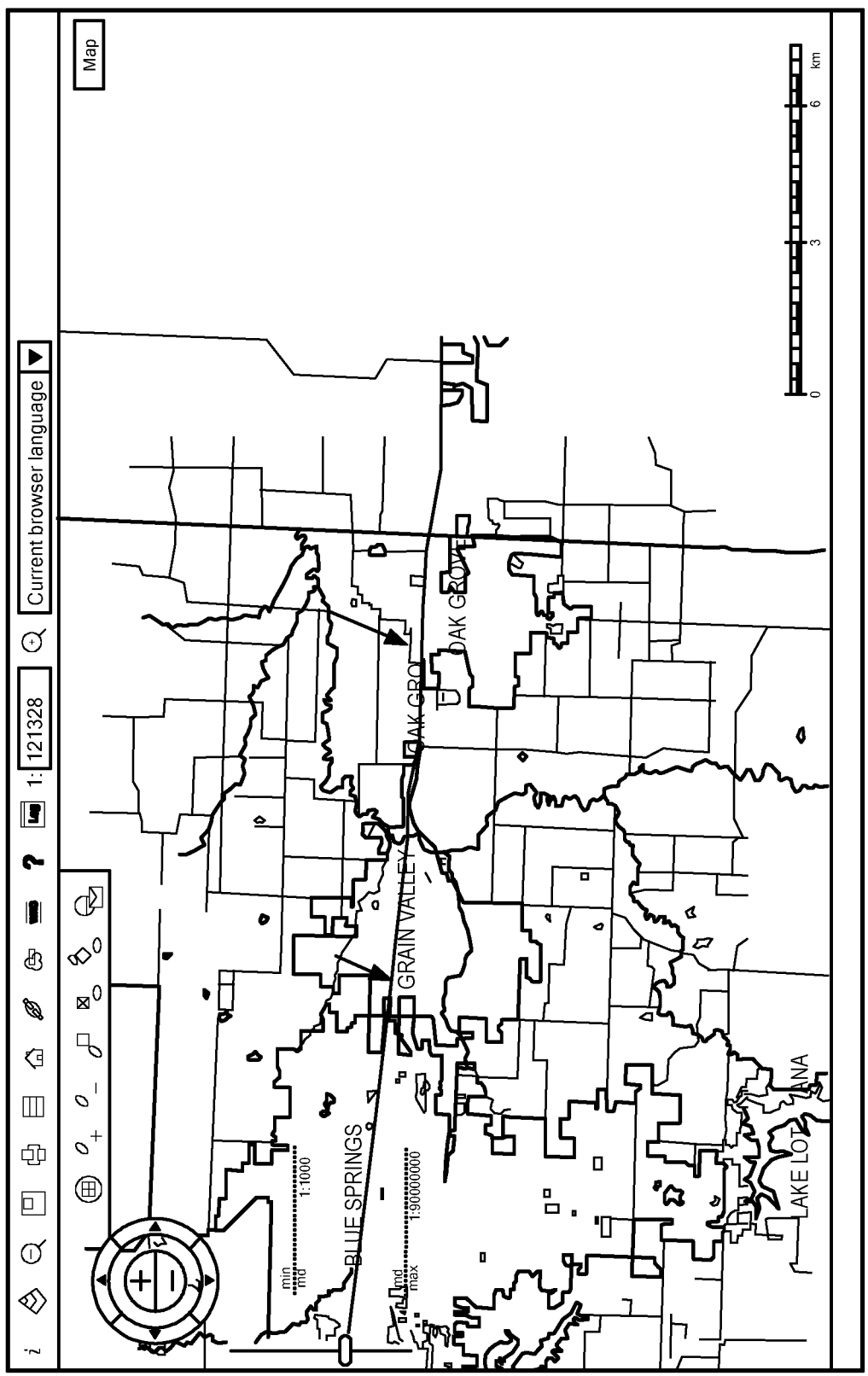
FIG. 5 depicts additional examples of improperly rendered (i.e., truncated) labels on a map.
Figure 6:
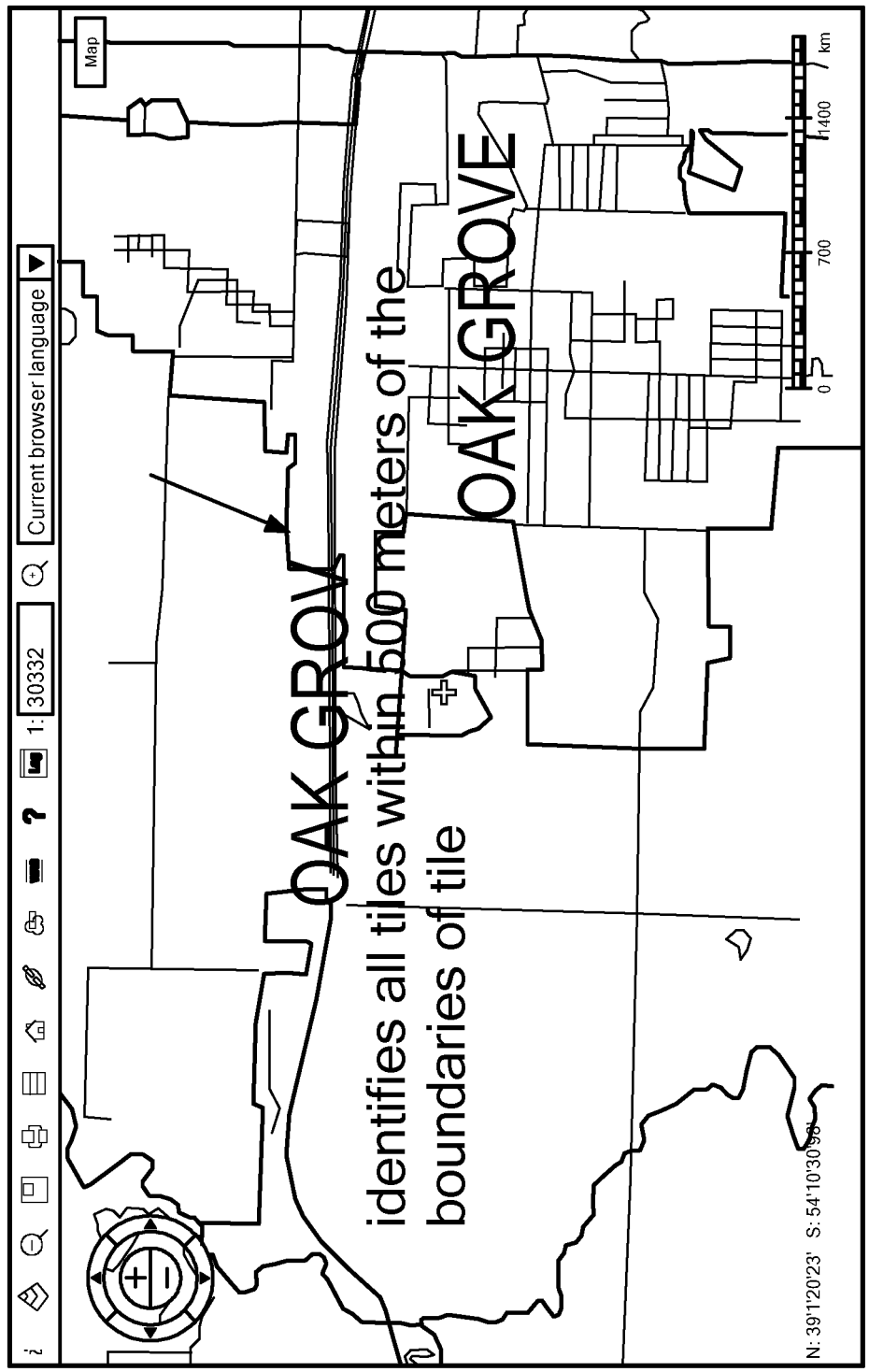
FIG. 6 depicts further examples of improperly rendered (i.e., truncated) labels on a map.

Using FIG. 3 to illustrate an example of various embodiments, suppose a user request includes the geographic area corresponding to tiles 1-10 and none of the tiles have been rendered and cached. The dimensions of each tile are 100 meters×100 meters. The server system 100 may search this area for features and find the label "This isn't even a particularly long label". Data for the label indicates that the label is 500 meters long. If this length exceeds the maximum known length of a feature, the server system 100 updates the maximum known length accordingly.

When the server system 100 retrieves data corresponding to tile 1, the data includes the label. The server system 100 may also search the geographic area within 500 meters of the boundaries of tile 1 for additional features that may be applied to the tile. In this example, no other features are present. Thus, the server system 100 renders tile 1 with the portion of the label that would be displayed within its boundaries.

In rendering tile 2, the server system 100 retrieves data corresponding to the tile and also searches within 500 meters of the boundaries of the tile for potential applicable features. The server system 100 thus finds the label "This isn't even a particularly long label" and uses its information to render tile 2 with the portion that would be displayed within its boundaries. The server system 100 repeats this process with the areas corresponding to the remaining tiles: searching areas within 500 meters of the boundaries of the tile, using information about found features to determine the portions that should be rendered with the tile, and performing the appropriate rendering. As a result, the tiles may be rendered so that they accurately depict the entire label.

Figure 8:
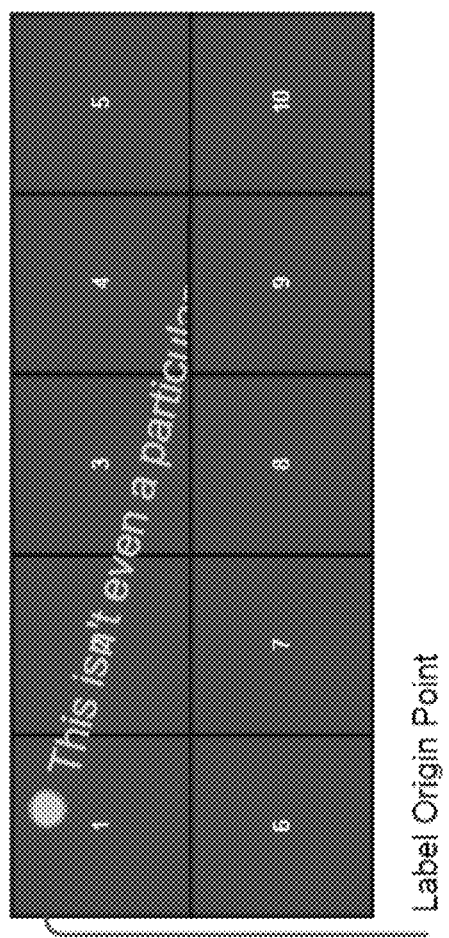
FIG. 8 depicts an incompletely rendered label that the present solution is capable of correcting.

Using FIG. 8 to illustrate another example of the invention, suppose the server system 100 receives a user request that includes areas corresponding to tiles 9 and 10 prior to requests that include areas covering any of tiles 1-8. Further, suppose the maximum known length of a feature at the time is 200 meters. As a result, the server system 100 searches areas within 200 meters of the boundaries of tiles 9 and 10 for features that might span these tiles (e.g., for features whose origins fall within 200 meters of the areas represented by tiles 9 and 10). Both searches fail to find any features. Because the label "This isn't even a particularly long label" falls outside the current search region, the server system 100 remains unaware of the label and renders tiles 9 and 10 without their corresponding portions of the label. Consequently, the tiles are initially rendered inaccurately.

When the geographic area in a user request includes the label "This isn't even a particularly long label", the server system 100 compares the length of this label to the maximum known length of a feature. Because this label is 500 meters long, the maximum known length is updated accordingly. Consequently, the web map tile service recognizes that rendered tiles falling within 500 meters of this label may have been rendered in correctly, i.e., without the corresponding portions of the label. The server system 100 identifies cached tiles corresponding to areas within 500 meters of the label and either deletes the entries or changes their status to "invalid". As a result, the server system 100 ensures that potentially erroneous tiles are not used to service future requests. In this example, because the cache 115 includes rendered tiles 9 and 10, the server system 100 removes their entries because their corresponding areas fall within 500 meters of the label.

If the geographic area of the user request includes tiles 1-4, the server system 100 renders these tiles. Tile 1 is rendered with its portion of the label. For tiles 2-4, the server system 100 searches the geographic area within 500 meters of their respective boundaries to find applicable features. Because each search yields the label associated with tile 1, tiles 2-4 are rendered with their corresponding portions of the label and stored in the cache 115.

Notably, at this time, tiles 9 and 10 are not re-rendered if they are not included in the user request. Instead, the next time a user request includes these tiles, the server system 100 will search the geographic area within 500 meters of the boundaries of tiles 9 and 10, find the label "This isn't even a particularly long label", apply the label to the rendering of the tiles, and store the tiles in the cache 115. Given the computational complexity of rendering tiles, the volume of tiles, and the volume of user requests, re-rendering tiles each time a potentially incorrect tile is discovered may degrade the latency of the WMTS service to an unacceptable level, causing technical problems with the system. Thus, the server system 100 may merely invalidate or remove entries in the cache 115 that are incorrect, and delay re-rendering until the tiles falls within a future user request. In this manner, tiles are re-rendered on an as-needed basis.

Features may have parameters aside from, or in addition to, their origins. For example, an icon for a geological formation, such as a mountain, may be defined by the boundaries of the graphic representing the mountain as well as its origin. In some embodiments, the WMTS server system 100 may separately track the maximum width and maximum length of graphical icons on the map. When the server system 100 renders a tile, the system 100 may search the adjacent geographic area based on these two parameters to determine if a portion of a graphical icon should be rendered with the tile.

Figure 1:
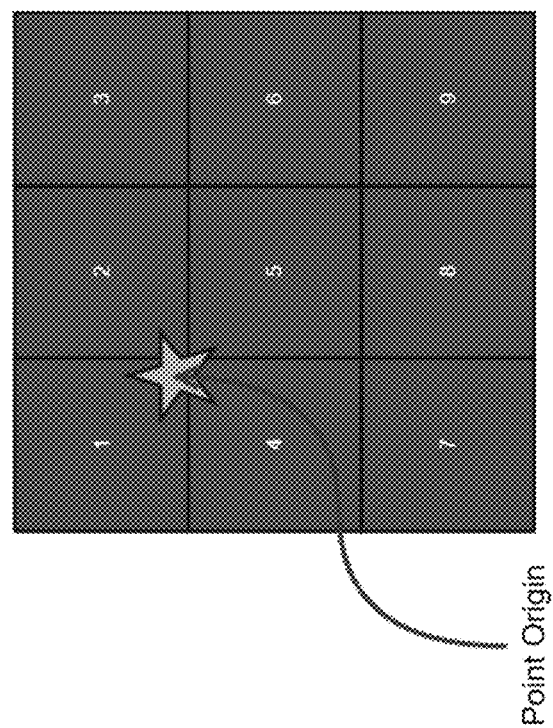
FIG. 1 depicts an exemplary feature to be displayed on tiles provided by a web map tile service.
Figure 2:
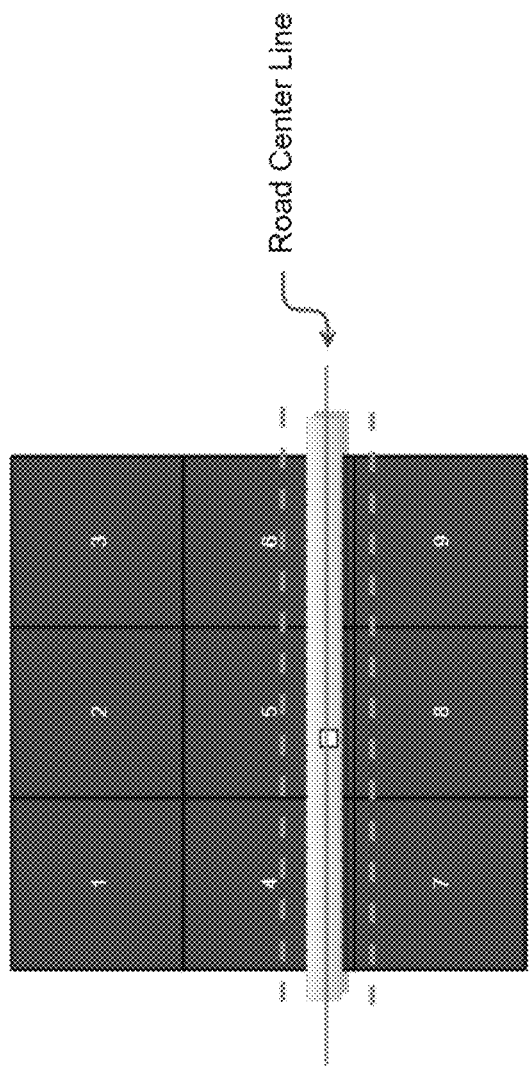
FIG. 2 depicts another exemplary feature to be displayed on tiles provided by a web map tile service.

Features may be defined according to other parameters altogether. For example, FIG. 2 depicts a road, a type of feature that may be defined by both its width and length, but which is not associated with an origin. In some embodiments, the road is represented as a line on a geographic area. As a result, when the WMTS searches a geographic area for features, the service associates the road solely with tiles that the center of the road traverses. However, because the rendered road also has a width, the road may span tiles that are otherwise overlooked. When a road is stored in the WMTS database 220, its data includes its width. Thus, for roads, the WMTS server system 100 may track the maximum width of roads on the map. When the server system 100 renders a tile, the system 100 may search the adjacent geographic area based on the maximum width of roads to determine if a portion of a road should be rendered with the tile.

As the server system 100 encounters more features in the tiles and updates the maximum known length of features accordingly, the server system 100 incrementally recognizes when previously rendered tiles may be incorrect, and removes those tiles from the cache, improving throughput, latency, accuracy, and other technical issues. The server system 100 also incrementally enlarges the territory searched, in response to subsequent user requests, to discover features that should be applied to a tile. Thus, over time, the system 100 improves its own ability to detect incorrect renderings in the cache to remove, and to detect larger features that should be applied to tiles that are more distant from the origin of a feature.

Moreover, when the server system 100 processes a user request, the server system 100 determines if the cache 115 already includes valid, rendered tiles corresponding to the requested map portion. If a tile is missing from the cache 115, or has an invalid entry in the cache 115, the server system 100 retrieves data for the tile from the database 220 and searches within the maximum known length of features for features that may apply to the tile. As a result, whenever a user requests a portion of a map, the server system 100 ensures that all of the tiles in the portion are rendered with features currently within the system's 100 abilities to detect.

Figure 9:
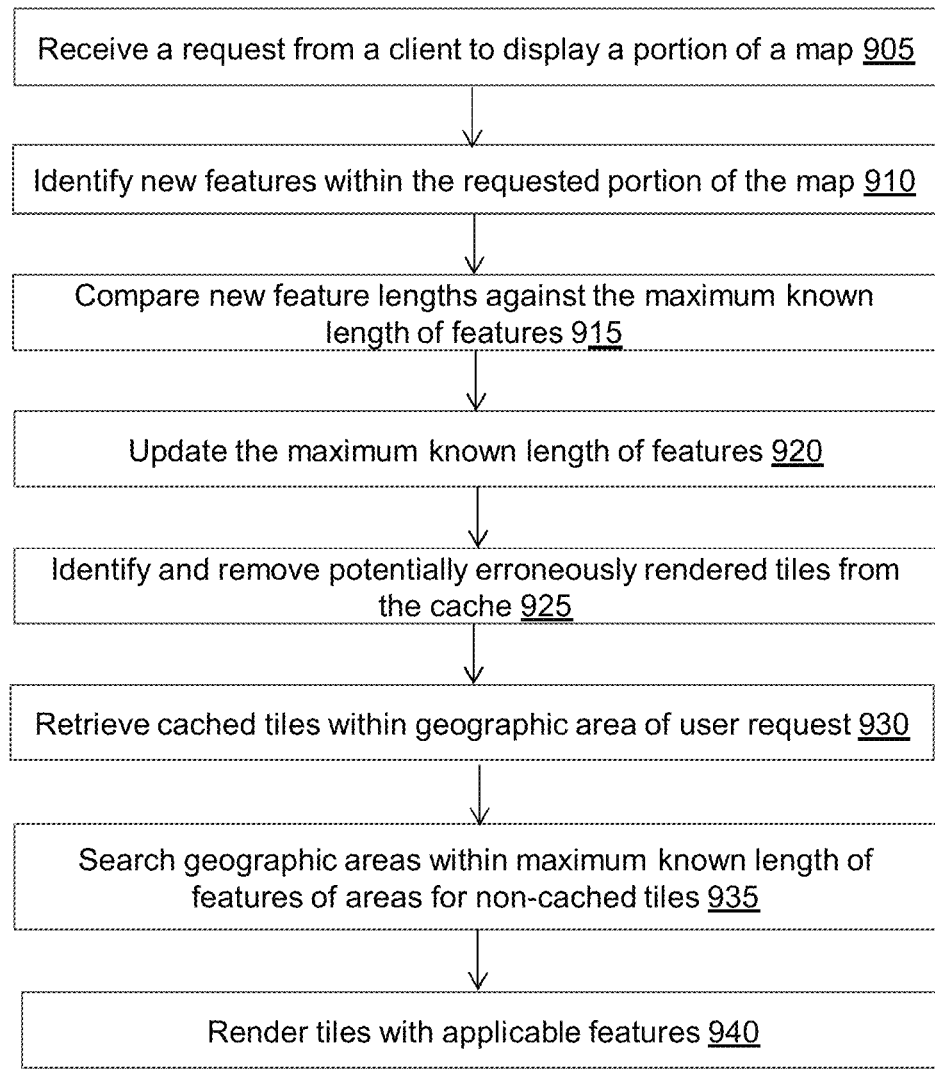
FIG. 9 depicts an exemplary flowchart of a method of ensuring that a web map tile service displays features spanning more than one tile.

FIG. 9 depicts an exemplary flowchart of a method of ensuring that a web map tile service displays features spanning more than one tile, in accordance with illustrative embodiments of the invention. The method includes receiving, by a web map tile service, a request from a client to display a portion of a map (step 905). The request may include the boundaries of the portion to display. The boundaries may be represented by latitudinal and longitudinal coordinates.

The method may identify new features within the requested portion of the map (step 910). For each feature, the method may compare the length of the new feature against the maximum known length of features on the map (step 915). If the length of the new feature exceeds the maximum known length, the method updates the maximum known length (step 920), identifies rendered tiles in the cache whose areas fall within the length of the new feature, and removes those rendered tiles (step 925).

If the cache includes a rendered tile within the requested portion of the map, the method retrieves the cached tile to service the user request (step 930). For each geographic area of the user request that corresponds to a non-cached tile, the method searches the geographic areas exceeding the boundaries corresponding to the tile by the maximum known length of features to identify features that may span the tile (step 935). The method renders the tile with features within its boundaries and features that span the tile (step 940), and stores the tile in the cache.

According to illustrative embodiments described herein, tracking the maximum known length of features in the map and searching neighboring tiles for tiles with features enables a WMTS system to identify tiles that may have been rendered inaccurately—a significant technical improvement to the system. As a result, the WMTS system may correct errors previously introduced into a display of a map. Furthermore, since embodiments of the invention may delay re-rendering tiles until a user requests them, the WMTS system may enable a map to be correct while ensuring an acceptable latency for serving user requests.

Additionally, as described above, the server system 100 for the WMTS enables maps to be updated dynamically, and also enables users to access the most recent changes. Returning to the server system 100 of FIG. 7, a client 210 may have access privileges for changing features of a map. The client may change any information about the feature, such as its length, style, or orientation. For example, the client may change the font and/or font size of a label, the color of an icon, or the type of symbol being depicted (e.g., changing a star to a circle). In some embodiments, a client may remove a feature from a map. Alternatively, a client may add a new feature, such as a representation of recently installed utility lines or fiber optics channels.

To that end, the client 210 may send the desired change to the server system 100. The server system 100 communicates with the WMTS database 220 to change data for a map, according to the client's 210 instructions. The server system 100 may also store information about the change in a modification log 120. In an alternative embodiment, a client 210 may communicate directly with the WMTS database 220 to change data for a map, and either the client 210 or the WMTS database 220 may inform the server system 100 of the change.

When the server system 100 receives a change, the server system 100 identifies the rendered tiles in the cache 115 that are impacted and prevents them from being displayed. In some embodiments, the server system 100 removes the identified tiles from the cache. Alternatively, the system 100 may set a field indicating that the tile is invalid and should not be used. As a result, when the server system 100 receives a user request for a portion of a map that includes a change, the server system 100 does not use the tile(s) in the cache. Instead, the server system 100 obtains updated data from the WMTS database 220 and re-renders the tile(s) with the most current depictions of features.

In some embodiments, the server system 100 identifies the impacted tiles based on the origin and length of the feature, based on the tiles associated with the feature and the width and/or length of the feature. If the feature is a label, the impacted tiles may be any tile that falls within a radius that is equal to the length of the feature, from the feature's origin. Alternatively, the impacted tiles may be any tile that falls within a radius equal to the maximum known length of features on the map. In another example, the server system 100 may use the feature's orientation (e.g., the angle that a label forms, relative to a horizontal axis) to identify the tiles. Instead of invalidating/removing all tiles within a particular radius of the feature's origin, the server system 100 may more accurately target tiles that are likely to be obsolete due to the client-driven change to the map. If the feature is an icon, the impacted tiles may be any tile that falls within a radius that is equal to half the length of the icon, assuming that the origin corresponds to the icon's center.

The server system 100 may also compare the updated length of the feature, based on the change, to the maximum known length of features on the map. If the length of the updated feature exceeds the maximum known length, the maximum known length is updated, accordingly. The server system 100 then uses this value for the maximum known length in any steps described herein.

In some embodiments, the server system 100 stores all received changes in the modification log 120 and processes the changes only after predetermined intervals of time elapse. Thus, the server system 100 propagates the changes to the display of maps on a periodic basis. The server system 100 may process the changes every minute, 5 minutes, 15 minutes, half hour, or hour, or any other interval of time as would be desired by one of ordinary skill in the art. In some embodiments, after the server system 100 processes a change, the server system 100 removes the entry for the change from the modification table 120, effectively clearing the modification log 120 on a periodic basis.

Figure 10:
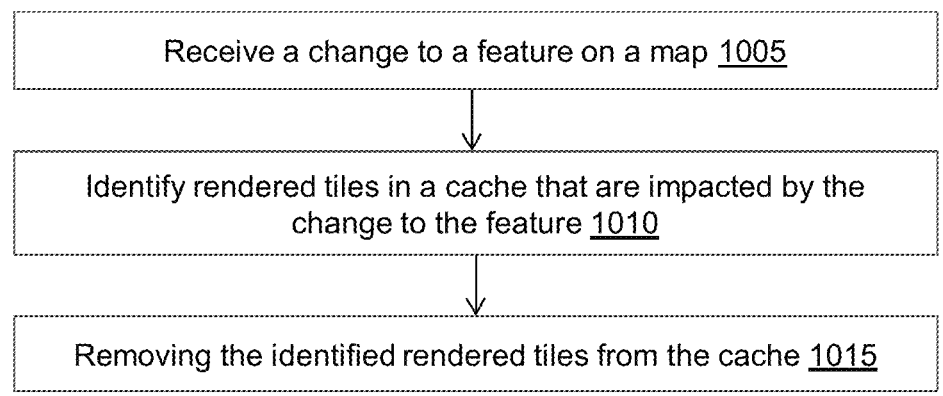
FIG. 10 depicts an exemplary flowchart of a method of ensuring that a web map tile service displays updated features of a map.

FIG. 10 depicts an exemplary flowchart of a method of ensuring that a web map tile service displays updated features of a map. The method includes receiving, by a web map tile service database, a change to a feature on a map (step 1005). The change may relate to a style, length, or orientation of the feature, or any combination thereof. The method also includes identifying, by a server system, rendered tiles in a cache that are impacted by the change to the feature (step 1010). The tiles may be identified based on the origin, length, and/or orientation of the feature. The tiles may be identified based on the tiles associated with the feature, and parameters such as the length and/or width of the feature. The tiles may also be identified based on the maximum known length of features on the map. The method further includes removing, by the server system, the identified rendered tiles from the cache (step 1015).

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a tangible removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software. The embodiments of the invention described above are intended to be merely exemplary; numerous variations and modifications will be apparent to those skilled in the art. All such variations and modifications are intended to be within the scope of the present invention as defined in any appended claims.

Without limitation, potential subject matter that may be claimed (prefaced with the letter "P" so as to avoid confusion with the actual claims presented below) includes:

P1. A method for ensuring, by a web map tile service, updated display of features, the method comprising:
receiving, by a web map tile service database, a change to a feature on a map;
updating, in the web map tile service database, the feature on the map based on the change;
identifying, by a server system, rendered tiles in a cache that are impacted by the change to the feature;
invalidating, by the server system, the identified rendered tiles in the cache;
receiving, by the server system, a request from a client to display a portion of the map that includes the updated feature;
retrieving, by the server system, the updated feature from the web map tile service database; and
re-rendering, by the server system, the invalidated tiles identified as impacted by the change to the feature, for display to the client.

P2. The method of any of the above potential subject matter, wherein invalidating the identified rendered tiles comprises:
removing, by the server system, the identified rendered tiles from the cache.

P3. The method of any of the above potential subject matter, further comprising:
storing, by the server system, the change to the feature in a modification log.

P4. The method of any of the above potential subject matter, wherein identifying the impacted rendered tiles in the cache comprises:
identifying the impacted rendered tiles based on the changes to the features stored in the modification log.

P5. The method of any of the above potential subject matter, wherein identifying the impacted rendered tiles in the cache comprises:
identifying the impacted rendered tiles after a predetermined interval of time has elapsed.

P6. The method of any of the above potential subject matter, wherein identifying the impacted rendered tiles in the cache further comprises:
removing all changes to features from the modification log after the impacted rendered tiles have been identified.

P7. The method of any of the above potential subject matter, wherein identifying the impacted rendered tiles in the cache comprises:
identifying the impacted tiles based on an origin of the feature and a length of the feature.

P8. The method of any of the above potential subject matter, wherein identifying the impacted rendered tiles in the cache comprises:
identifying the impacted tiles based on an origin of the feature and a maximum known length of features on the map.

P9. The method of any of the above potential subject matter, wherein receiving the change to the feature comprises:
receiving a change to a style, length, or orientation of the feature, or any combination thereof.

P10. The method of any of the above potential subject matter, wherein receiving the change to the feature comprises:

comparing the length in the change to the feature to a maximum known length of features on the map; and updating the maximum known length based on the length in the change to the feature.

P11. A computer program product including a non-transitory computer-readable medium having computer code thereon for ensuring updated display of features by a web map tile service, the computer code comprising program code for performing any of the steps in any of the above cited potential subject matter.

P12. A method for ensuring, by a web map tile service, display of features spanning more than one tile, the method comprising:

receiving, by a server system using the web map tile service, a request from a client to display a portion of a map;

identifying, by the server system, a new feature within the requested portion of the map;

updating, by the server system, a maximum known length of features on the map based on a length of the new feature;

identifying, by the server system, potentially erroneously rendered tiles in the requested portion of the map based on (1) at least one tile associated with the new feature, and (2) the maximum known length of features on the map;

invalidating, by the server system, the potentially erroneously rendered tiles in the cache;

receiving, by the server system, a request from a client to display a second portion of the map;

for each tile within the second portion of the map that has not been validly rendered, searching, by the server system, for at least one feature within the maximum known length of features on the map from the tile; and rendering, by the server system, the tile with any features found within the maximum known length of features on the map from the tile, for display to the client.

P13. The method according to any of the above potential subject matter, wherein invalidating the potentially erroneously rendered tiles in the cache comprises:

removing, by the server system, the potentially erroneously rendered tiles from the cache.

P14. The method according to any of the above potential subject matter, wherein rendering the tile comprises:

rendering, by the server system, the tile according to the text, style, or combination thereof of features found within the maximum known length of features on the map from the tile.

P15. The method according to any of the above potential subject matter, wherein updating the maximum known length of the features on the map comprises:

updating the maximum known length of features on the map based on a distance on the ground covered by the new feature.

P16. A computer program product including a non-transitory computer-readable medium having computer code thereon for ensuring, by a web map tile service, display of features spanning more than one tile, the computer code comprising program code for performing any of the steps in any of the above cited potential subject matter.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for ensuring, by a web map tile service, updated display of features, the method comprising:

receiving, by a web map tile service database, a change to a feature on a map, the feature having an origin in an origin tile;

updating, in the web map tile service database, the feature on the map based on the change;

identifying, by a server system, rendered tiles in a cache that are impacted by the change to the feature, such impacted tiles being tiles, in addition to the origin tile, that fall within a radius of the origin of the feature, the radius comprising the length of the feature subsequent to the updating;

invalidating, by the server system, the identified rendered tiles in the cache;

receiving, by the server system, a request from a client to display a portion of the map that includes the updated feature;

retrieving, by the server system, the updated feature from the web map tile service database; and re-rendering, by the server system, the invalidated tiles identified as impacted by the change to the feature, for display to the client.

2. The method of claim 1, further comprising:

storing, by the server system, the change to the feature in a modification log.

3. The method of claim 2, wherein identifying the impacted rendered tiles in the cache comprises:

identifying the impacted rendered tiles based on the changes to the features stored in the modification log.

4. The method of claim 1, wherein such impacted tiles include all tiles, in addition to the origin tile, that fall within a radius of the origin of the feature.

5. The method of claim 1, wherein the radius comprises the maximum known length of features on the map.

6. The method of claim 1, wherein receiving the change to the feature comprises:

receiving a change to a style, length, or orientation of the feature, or any combination thereof.

7. The method of claim 1, wherein receiving the change to the feature comprises:

comparing the length in the change to the feature to a maximum known length of features on the map; and updating the maximum known length based on the length in the change to the feature.

8. A computer program product including a non-transitory computer-readable medium having computer code thereon for ensuring updated display of features by a web map tile service, the computer code comprising:

program code for receiving a change to a feature on a map, the feature having an origin in an origin tile;

program code for updating, in the web map tile service database, the feature on the map based on the change;

program code for identifying rendered tiles in a cache that are impacted by the change to the feature, such impacted tiles being tiles, in addition to the origin tile, that fall within a radius of the origin of the feature, the radius comprising the length of the feature subsequent to the updating;

program code for invalidating the identified rendered tiles in the cache;

program code for receiving a request from a client to display a portion of the map that includes the updated feature;

program code for retrieving the updated feature from the web map tile service database; and program code for re-rendering the invalidated tiles identified as impacted by the change to the feature, for display to the client.

9. The computer program product of claim 8, further comprising:
program code for storing the change to the feature in a modification log.

10. The computer program product of claim 9, wherein program code for identifying the impacted rendered tiles in the cache comprises:
program code for identifying the impacted rendered tiles based on the changes to the features stored in the modification log.

11. The computer program product of claim 8, wherein such impacted tiles include all tiles, in addition to the origin tile, that fall within a radius of the origin of the feature.

12. The computer program product of claim 8, wherein the radius comprises a maximum known length of features on the map.

13. The computer program product of claim 8, wherein program code for receiving the change to the feature comprises:
program code for receiving a change to a style, length, or orientation of the feature, or any combination thereof.

14. The computer program product of claim 8, wherein program code for receiving the change to the feature comprises:
program code for comparing the length in the change to the feature to a maximum known length of features on the map; and
program code for updating the maximum known length based on the length in the change to the feature.

15. A method for ensuring, by a web map tile service, display of features spanning more than one tile, the method comprising:
receiving, by a server system using the web map tile service, a request from a client to display a portion of a map;
identifying, by the server system, a new feature within the requested portion of the map;
updating, by the server system, a maximum known length of features on the map based on a length of the new feature;
identifying, by the server system, potentially erroneously rendered tiles in the requested portion of the map based on (1) at least one tile associated with the new feature, and (2) the maximum known length of features on the map;
invalidating, by the server system, the potentially erroneously rendered tiles in the cache;
receiving, by the server system, a request from a client to display a second portion of the map;
for each tile within the second portion of the map that has not been validly rendered,
searching, by the server system, for at least one feature within the maximum known length of features on the map from the tile; and
rendering, by the server system, the tile with any features found within the maximum known length of features on the map from the tile, for display to the client.

16. The method of claim 15, wherein invalidating the potentially erroneously rendered tiles in the cache comprises:
removing, by the server system, the potentially erroneously rendered tiles from the cache.

17. The method according to claim 15, wherein updating the maximum known length of the features on the map comprises:
updating the maximum known length of features on the map based on a distance on the ground covered by the new feature.

18. A computer program product including a non-transitory computer-readable medium having computer code thereon for ensuring display of features spanning more than one tile, by a web map tile service, the computer code comprising:
program code for receiving a request from a client to display a portion of a map;
program code for identifying a new feature within the requested portion of the map;
program code for updating a maximum known length of features on the map based on a length of the new feature;
program code for identifying potentially erroneously rendered tiles in the requested portion of the map based on (1) at least one tile associated with the new feature, and (2) the maximum known length of features on the map;
program code for invalidating the potentially erroneously rendered tiles in the cache;
program code for receiving a request from a client to display a second portion of the map;
program code for, for each tile within the second portion of the map that has not been validly rendered,
searching for at least one feature within the maximum known length of features on the map from the tile; and
rendering the tile with any features found within the maximum known length of features on the map from the tile, for display to the client.

19. The computer program product of claim 18, further comprising:
program code for removing the potentially erroneously rendered tiles from the cache.

20. The computer program product of claim 18, further comprising:
program code for updating the maximum known length of features on the map based on a distance on the ground covered by the new feature.

* * * * *